United States Patent Office 2,927,927
Patented Mar. 8, 1960

2,927,927

CERTAIN 4-ACYL, 1-(p-HYDROXYPHENYL)-2-PHENYL, 3,5-DIOXOPYRAZOLIDINES

Rolf Denss and Franz Häfliger, Basel, Switzerland, assignors, by mesne assignments, to Geigy Chemical Corporation, New York, N.Y., a corporation of Delaware No Drawing. Application December 12, 1955
Serial No. 552,290

Claims priority, application Switzerland
December 16, 1954

3 Claims. (Cl. 260—310)

The present invention concerns 4-substituted 1.2-diphenyl-3.5-dioxo-pyrazolidines which can be used therapeutically as well as processes for the production thereof. 1.2-diphenyl-3.5-dioxo-4-n-butyl-pyrazolidine has already attained great therapeutical importance as a preparation for the treatment of rheumatic complaints. However, 1.2-diphenyl-3.5-dioxo-pyrazolidines substiuted in the 4-position by an acyl radical have not been known up to now.

Surprisingly it has now been found that such compounds of the general formula:

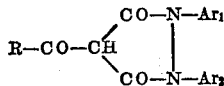    I or the tautomeric forms thereof wherein:

R represents a hydrocarbon radical which may be interrupted by O, —CO—O— or S and which may be substituted by halogen or hydroxyl groups, and
$Ar_1$ and $Ar_2$ represent hydroxyphenyl and phenyl radicals, respectively, wherein R' represents a hydrocarbon radical, can be produced in a simple manner by reacting a reactive functional derivative of a carboxylic acid of the general formula:

R—COOH    II or the free carboxylic acid with a malonyl hydrazobenzene, (=1.2-diphenyl-3.5-dioxo-pyrazolidine) of the general formula:

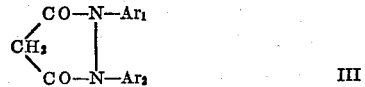    III the reaction being performed if necessary in the presence of a condensing agent.

The compounds produced according to the present invention have valuable therapeutical properties, in particular antiphlogistic and antipyretic activity. A particularly advantageous modification of the process for their production is the condensation of a carboxylic acid halide or anhydride with a compound of the general Formula III in the presence of pyridine or another tertiary organic base, and also in the presence of inorganic basic condensation agents such as, for example, potassium carbonate. Carboxylic acid halides can also be reacted in the presence of aluminium chloride analogous to the condensation of carboxylic acid chlorides with 1-phenyl-2.3-dimethyl-5-pyrazolone described by B. Zorn and F. H. Schmidt in the Zeitschrift für physiolog. Chemie, 298, 140 (1954). Examples of condensation agents with a similar action are ferric chloride and bortrifluoride. Further, also carboxylic acid esters can be used in the presence of alkali metal alcoholates for the reaction with compounds of the general Formula III. In particular acid anyhdrides such as, e.g. acetanhydride, but also acid halides can react in the desired manner, also in the absence of condensing agents, on heating with compounds of the general Formula III.

Whilst the addition of a solvent is often superfluous on using acid anhydrides, the reactions with acid halides are advantageously performed in inert organic solvents; when basic substances are used as condensing agents, e.g. in benzene or chloroform and when using aluminium chloride as condensing agent, for example in carbon tetrachloride, chloroform or nitrobenzene. Reactions with carboxylic acid esters can be performed for example in alcohols having a suitable boiling point or also in inert organic solvents.

Compounds of the general Formula I in which $Ar_1$ and also, possibly $Ar_2$ have a hydroxyl group can, like compounds suostituted differently, be produced by condensation of the corresponding starting material, here of 1-hydroxyphenyl-2-phenyl-3.5-dioxo-pyrazolidines or 1.2-bishydroxyphenyl-3.5-dioxo-pyrazolidines, for example with halides of carboxylic acids of the general Formula II in the presence of pyridine. Such compounds can also be obtained however, by reacting, in the presence of a condensing agent, a carboxylic acid of the general Formula II or reactive functional derivatives thereof with a malonyl hydrazobenzene of the general formula:

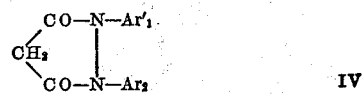    IV wherein:

$Ar'_1$ represents an aralkyloxyphenyl radical and
$Ar_2$ has the meaning given above, here in particular that of an unsubstituted phenyl radical or of an aralkyloxyphenyl radical, and hydrogenolysing the condensation product by means of catalytically activated hydrogen. In particular the benzyloxyphenyl radicals are named as suitable aralkyloxyphenyl radicals $Ar'_1$ and, possibly, $Ar_2$, which radicals are split in the hydrogenolysis into hydroxyphenyl radicals and toluene. As condensing agents, those named above, in particular pyridine, can be used.

Further, compounds of the general Formula I in which $Ar_1$ and possibly also $Ar_2$ have a hydroxyl group, can also be obtained by hydrolysis of compounds in which $Ar_1$ or $Ar_1$ and $Ar_2$ are substituted by one or more radicals of the formula R'—CO—O—.

The new 1-(p-hydroxyphenyl-2-phenyl-3.5-dioxo-4-acyl-pyrazolidines are mostly colourless crystallised compounds. They form salts, some of which are difficultly soluble, with inorganic and organic bases.

The following examples serve to further illustrate the invention. Parts are given as parts by weight and their relationship to parts by volume is as that of grammes to cubic centimetres. The temperatures are in degrees centigrade.

*Example 1*

14.1 parts of benzoyl chloride are dissolved in 15 parts by volume of benzene and added dropwise while stirring to a suspension of 35.8 parts of p-benzyloxy malonyl hydrazobenzene (produced from p-benzyloxy hydrazobenzene and malonic acid diethyl ester, M.P. 185–190° on decomposition), 250 parts by volume of benzene and 35 parts by volume of pyridine. On completion of the reaction, the product is filtered under suction, and the precipitate is recrystallised from alcohol, M.P. 116–117°.

23.1 parts of the 1-(p-benzyloxy-phenyl)-2-phenyl-4-benzoyl-3.5-dioxo-pyrazolidine so obtained are dissolved in 400 parts by volume of 1 N-caustic soda lye and 800 parts by volume of alcohol, and, at room temperature and normal pressure, are shaken with 20 parts of nickel catalyst (Raney nickel) in an $H_2$ atmosphere. After taking up the calculated amount of hydrogen (1 mol per mol starting product) practically no more hydrogen is taken up. The catalyst is filtered off and 250 parts by volume of 2 N-hydrochloric acid and 100 parts by volume of water are added under ice cooling to the filtrate. On completion of the crystallisation, the crystallised product 1-(p-hydroxyphenyl)-2-phenyl-4-benzoyl-3.5-dioxo-pyrazolidine is recrystallised from 80% alcohol. It melts at 198–200°.

For example, also 1-(p-benzyloxy-phenyl)-2-phenyl-4-phenyl-acetyl-3.5-dioxo-pyrazolidine (M.P. 103–106°) and 1-(p-hydroxyphenyl)-2-phenyl-4-phenylacetyl-3.5-dioxo-pyrazolidine (M.P. 155–157°) are obtained in an analogous manner.

*Example 2*

13.4 parts of p-hydroxy malonyl hydrazobenzene (produced from p-benzyloxy malonyl hydrazobenzene by hydrogenolysis analogous to the process of Example 1, M.P. 175–185°) are suspended in 100 parts by volume of benzene and 17 parts by volume of pyridine whereupon 5.4 parts of butyryl chloride dissolved in 5 parts by volume of benzene are added dropwise while stirring. The reaction mixture is stirred for about 14 hours at room temperature and then the precipitate is filtered off under suction and stirred up and extracted with 500 parts by volume of 2 N-sodium carbonate solution. The sodium carbonate extract is filtered with charcoal and then acidified with 2 N-hydrochloric acid under ice cooling. The precipitate which forms is filtered off under suction and recrystallised from aqueous alcohol. The 1-(p-hydroxy-phenyl)-2-phenyl-4-butyryl-3.5-dioxo-pyrazolidine melts at 144–146°.

What we claim is:

1. 1-(p-hydroxyphenyl)-2-phenyl-4-butyryl-3.5-dioxopyrazolidine.
2. 1-(p-hydroxyphenyl)-2-phenyl-4-phenylacetyl-3.5-dioxo-pyrazolidine.
3. 1-(p-hydroxyphenyl)-2-phenyl-4-benzyl-3.5-dioxopyrazolidine.

References Cited in the file of this patent
UNITED STATES PATENTS

| | | |
|---|---|---|
| 2,562,830 | Stenzl | July 31, 1951 |
| 2,700,671 | Häfliger | Jan. 25, 1955 |